(12) United States Patent
Yin

(10) Patent No.: US 7,257,530 B2
(45) Date of Patent: Aug. 14, 2007

(54) METHOD AND SYSTEM OF KNOWLEDGE BASED SEARCH ENGINE USING TEXT MINING

(75) Inventor: Hongfeng Yin, 10280 Plum Tree La., Cupertino, CA (US) 95014

(73) Assignee: Hongfeng Yin, Cupertino, CA (US)

( * ) Notice: Subject to any disclaimer, the term of this patent is extended or adjusted under 35 U.S.C. 154(b) by 884 days.

(21) Appl. No.: 10/366,033

(22) Filed: Feb. 12, 2003

(65) Prior Publication Data

US 2003/0163302 A1 Aug. 28, 2003

Related U.S. Application Data

(60) Provisional application No. 60/360,247, filed on Feb. 27, 2002.

(51) Int. Cl.
*G06F 17/21* (2006.01)
(52) U.S. Cl. ...................................... 704/10
(58) Field of Classification Search ............... None
See application file for complete search history.

(56) References Cited

U.S. PATENT DOCUMENTS

| | | | |
|---|---|---|---|
| 6,611,825 B1 * | 8/2003 | Billheimer et al. | 706/45 |
| 6,735,578 B2 * | 5/2004 | Shetty et al. | 706/16 |
| 6,757,676 B1 * | 6/2004 | Sugaya et al. | 707/5 |

* cited by examiner

*Primary Examiner*—Abul K. Azad

(57) ABSTRACT

A method of text mining is disclosed for automatically building text knowledge base. First, the text mining is applied to the web pages downloaded from internet/intranet or other text documents to extract phrases information. Then, the phrases are classified using automatic classification method or using existed classification information. In addition, the weights between the phrases are trained by using the text information in the web pages or the documents. A knowledge base system is built using the text mining results. The knowledge base is used to directly provide knowledge for a search. Also, the knowledge base helps search engine refine search results.

6 Claims, 8 Drawing Sheets

METHOD AND SYSTEM OF KNOWLEDGE BASED SEARCH ENGINE USING TEXT MINING

CROSS-REFERENCE TO RELATED APPLICATION

This application is entitled to the benefit of Provisional patent application Ser. No. 60/360,247 filed 2002 Feb 27.

FEDERALLY SPONSORED RESEARCH

Not Applicable

SEQUENCE LISTING OR PROGRAM

Not Applicable

FIELD OF THE INVENTION

The present invention relates, generally, to a process, system and article of knowledge discovery using text mining, data mining, machine learning, natural language processing, information indexing, search engine, and pattern recognition.

BACKGROUND OF THE INVENTION

The advent of the World Wide Web creates new challenges for information processing. The amount of information is growing exponentially, as well as the number of internet users. There are billions web pages and hundreds million users so far. The current internet provides huge amount of information which is beyond the human being's capability to handle it. Also, more and more low quality and redundant information is posted in the internet, which creates even more difficulties to find useful information. Without an efficient way to help human handle the internet/intranet information, more and more money and time will be wasted on the internet information highway.

Also, with advances in computer technology, network, storage and internet/intranet technologies, vast amounts of information have become readily available throughout the world. Actually, more and more businesses, individuals and institutions rely on computer-accessible information on a daily basis. However, as the total amount of accessible information increases, the ability to find useful information becomes increasingly more difficult.

Currently, there are three major ways to find internet/intranet information: high quality human maintained directories such as Yahoo!, search engines, and knowledge based search. Human maintained directories cover popular topics effectively but are subjective, expensive to build and maintain, slow to improve. Also, a directory can only cover limited topics.

Search engines first use special software, referred to as 'robots', 'spiders' or 'crawlers', go out and retrieve web pages. The web pages are parsed to generate keywords to index the pages. Then indexes are stored in a database with a rank for each web page. The rank reflects the relevance of the web pages to certain keywords. When an internet user enters a query with a keyword or keywords, search engines retrieve the web pages which match the keywords in the database.

Automated search engine usually return too many low quality matches. Most internet portals provide both directory and search engine services for user queries. Although the search engine technologies have been improved in the past several years, people still feel frustrated for internet information search. Often, the wanted information cannot be found or it needs to spend too much time to find it. The search results are a list of web pages that have to be scanned to find useful information. There may be millions web pages for some commonly used words. Also, the search results are the same for different people or for same people at different time. Lastly, the search can only find the web pages that contain the query words, however the new knowledge that is not explicitly contained in web pages cannot be found.

Knowledge based search is another way to search internet information, such as Ask Jeeves. However, like the directories, such knowledge base is built by people, which is also very costly and difficult to update and maintain, and the knowledge base cannot be very big. Also, the covered knowledge in such system is quite limited.

For structured data like relational database, knowledge base can be built using data mining methods. Such data mining methods can be implemented with the standard classification, clustering or machine learning algorithms. However, internet/intranet web pages and about 80% corporate information are stored with unstructured text documents like e-mail, news article, technical and patent portfolios. To extract knowledge from text data, some complicated text mining and learning algorithms are required.

Currently, most text mining researches and developments are still similar to the data mining algorithms and approaches such as standard clustering, classification, predication and decision tree algorithms. However, the problems which text mining has to solve are quite different with data mining. Firstly, for data mining, the samples usually have fixed feature set. In most cases, all samples have the same number of features. For text mining, it is hard to define features for text, or the feature set is huge if each word is considered as a feature. Secondly, it is hard to define what knowledge is for text. For data mining, knowledge is considered as the training results of classification, predication, regression or other functions. However, for text mining, these methods cannot provide enough information for user's query or the retrieved information may not be what user wants. Also, text mining needs very large amount of text information to extract reasonable knowledge. In addition, the accuracy and speed for text mining are also very important for real application.

Text mining is a relatively new research area and has a lot of challenging problems. However, there are also a lot advantages for the development of text mining technology and method. Firstly, it is easy to collect huge amount of text information from the World Wide Web for analysis. Secondly, a lot of terms have already been manually classified in the web that can be directly used. Also, the internet/intranet users can be directly benefited from the new text mining methods.

SUMMARY OF THE INVENTION

It is one object of the present invention to automatically build a knowledge base system that provides the most relevant information to user's query. Such knowledge base construction method largely reduces the construction time in comparison with the directory or knowledge base system built by human beings. Also, such knowledge base system can cover more knowledge and easier to maintain than the conventional human made systems.

The present invention is a text mining method for automatically building knowledge based search system of internet/intranet. Web pages are first downloaded from internet using a crawler. Then they are parsed to generate text files that only include words for the web pages. Unlike search engine to build an index database for the web pages, a text mining method is used to extract knowledge from the web pages and build a knowledge base for the web pages. When user enters a query, the knowledge base retrieves and presents knowledge to the user instead of only providing web pages by search engines. In this way, the user may directly get the wanted information. Also, the knowledge base contains some new knowledge that cannot be found directly from web pages. The knowledge base can also provide more relevant information than search engines. Even if the user cannot direct find the desired information, the knowledge can help him/her to refine search engine results.

Further, the present invention comprises a text knowledge representation method. Text knowledge is represented as a weighted network with each phrase as a node of the network. The connection weights of the network are automatically trained.

Also, the present invention comprises a knowledge search method that provides a list of ranked phrases that are related to a query.

Furthermore, the present invention comprises a knowledge classification method that classifies the phrases into predefined classes. The retrieved phrases in a same class are displayed together for a query.

DESCRIPTION OF THE PREFERRED EMBODIMENTS

Figure 1:
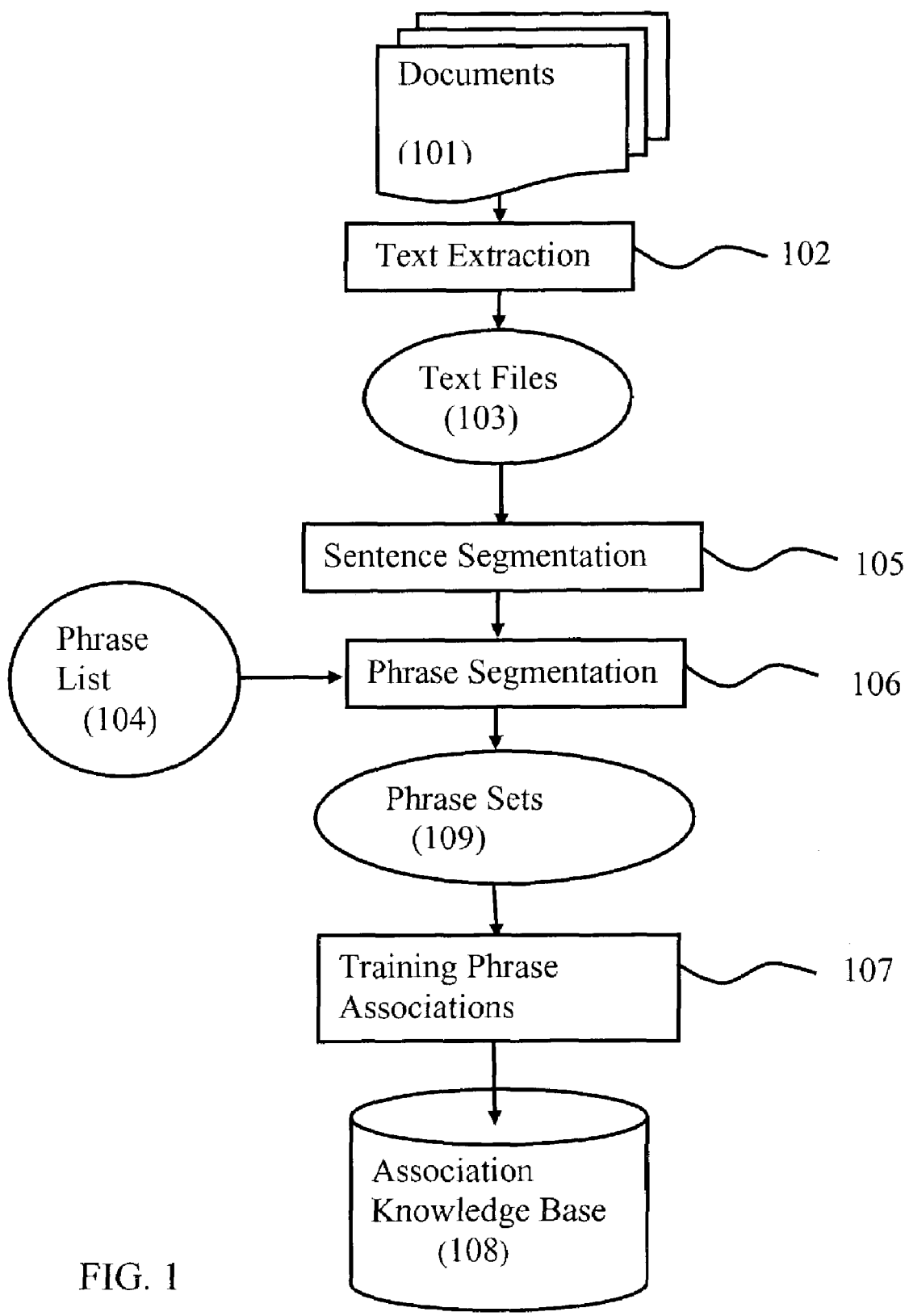
FIG. 1 shows the processes of building an association knowledge base.

A preferred embodiment of the knowledge base construction method of the present invention is illustrated in FIG. 1. In the beginning, a large amount of documents 101 is collected. The documents can be any files that include text information, such as internet/intranet web pages, e-mails, Word format documents, PDF documents, etc.

The text extraction (or text parser) 102 will filter out document format and other non-text information to get pure text information in the documents. The text information is stored text files 103. The Phrase List 104 is composed as FIG. 3.

With the text files, first, Sentence Segmentation 105 is used to segment each file to sentences or a small sequence of words.

Sentence Segmentation 105 includes following steps:
1) Open a new text file of 103 and set current position at beginning of the file.
2) A new sentence is set as empty string.
3) Read a word from the text file and append the word to the sentence. (a word is defined as a string of characters without space or mark). Move the current position after the word.
4) If the number of words in the sentence is greater than a predetermined value or a sentence end mark "." is found, go to 5). Otherwise go to 3).
5) Save the sentence.
   If the current position is at the end of the text file and the file is the last file of 103, go to 6).
   If the current position is at the end of text file and the file is not the last file of 103, go to 1).
   Otherwise, go to 2).
6) End.

After Sentence Segmentation, a sentence S is further segmented into phrases by following Phrase Segmentation 104 methods:
1) Create an empty phrase set PS.
2) nSize is set as the number of the words in the sentence S.
3) Phrases P and $P_1$ are assigned as empty strings.
4) Set bMultiWords=FALSE;
5) Set I=0;
6) If I<nSize, I=I+1, go to 7); otherwise go to 11)
7) If P is not an empty string, set bMultiWords=TRUE, append the Ith word in S to P.
8) If P is not in the Phrase List 104, go to 9), otherwise go to 10)
9) If $P_1$ is not empty, add $P_1$ to PS.
   Phrases P and $P_1$ are assigned as empty strings.
   If bMultiWords is TRUE, I=I−1,
   set bMultiWords=FALSE. Go to 6).
10) Append the Ith word in S to $P_1$.
11) If $P_1$ is in the Phrase List 104, add $P_1$ to PS, end.

After sentence segmentation and phrase segmentation, Phrase Sets 109 are generated. Then, a Training Phrase Association 107 algorithm is applied to the Phrase Sets 106 to build an Association Knowledge Base 108.

Figure 2:
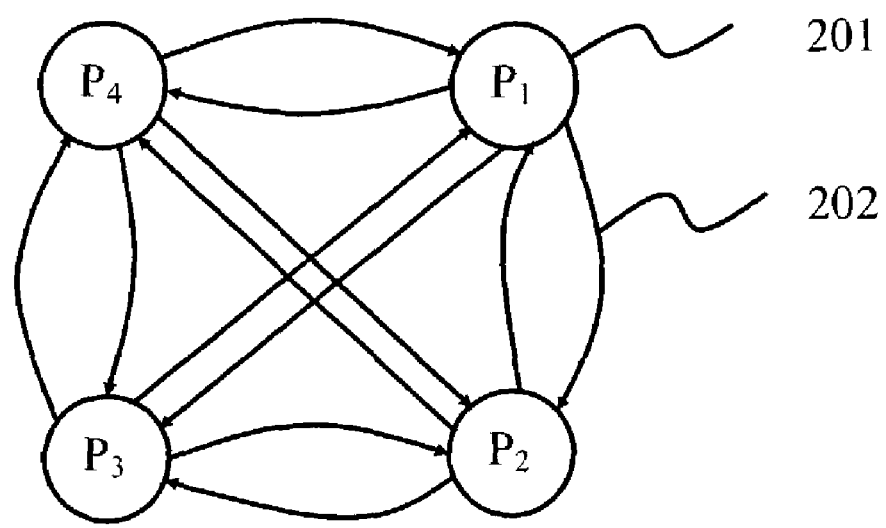
FIG. 2 shows text knowledge representation with a network structure.

The association knowledge base is represented as a weighted network structure shown in FIG. 2. Each phrase is represented by a node 201 of the network. Two related phrases have one or two connections 202 with weights to represent the strength of the connections. The network is saved to hard disk using a structure such as B-Tree. In memory, the network is implemented with a tree structure (for example, using map with STL) or hash table.

The Training Phrase Association 107 comprises steps:
1) Create an empty phrase association network N.
2) Count number of each phrase that appears in the Phrase Sets 106.
3) For each phrase set in 106, do
4) For each pair of phrases in a phrase set, $P_i$ and $P_j$, where $P_i$ is not equal to $P_j$, do
5) If connection weight $W_{ij}$ between $P_i$ and $P_j$ exists in N, set $W_{ij}=W_{ij}+1$;
   Otherwise, add a new connection weight $W_{ij}$ into N and set $W_{ij}=1$.

Training Phrase Association 107 also includes a network pruning procedure to get ride of weak connections in the association network N. Let $C_i$ is the total counts of phrase $P_i$ and $C_j$ is the total counts of phrase $P_j$.

If $W_{ij}/C_i<T$ and $W_{ij}/C_j<T$, then remove weight $W_{ij}$ from N, where T is a predetermined pruning threshold.

Figure 3:
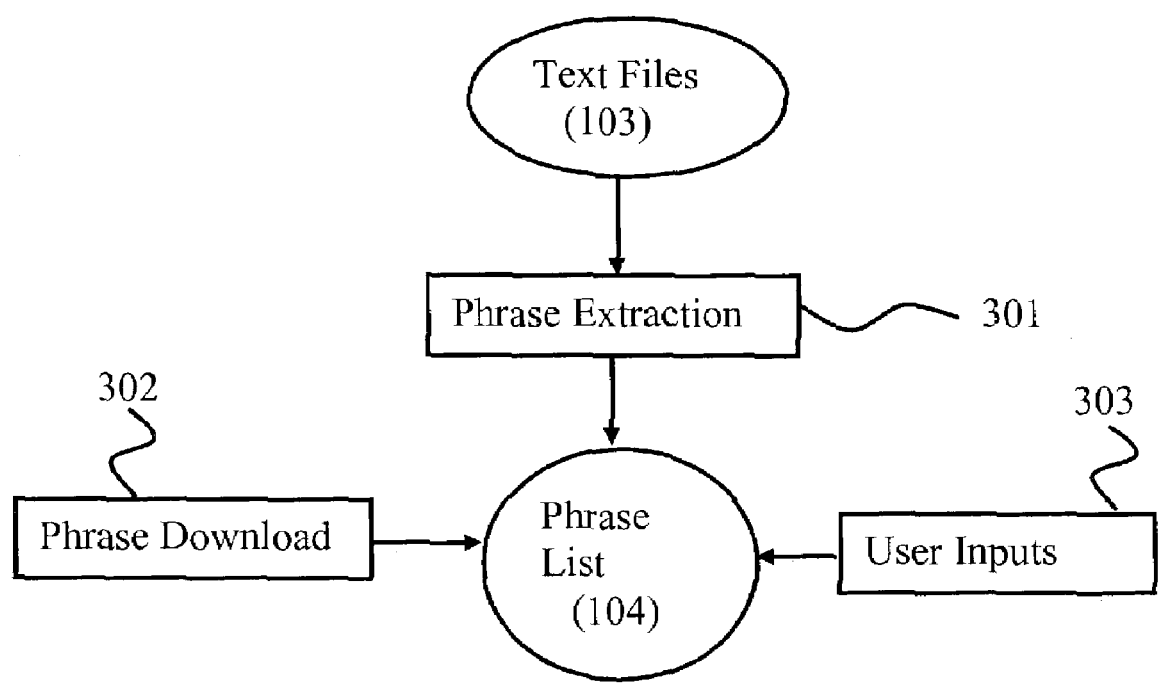
FIG. 3 shows the methods of generating phrase list.

FIG. 3 shows three methods of composing Phrase List 104. First, phrases are automatically extracted from Text Files 103 using Phrase Extraction 301 method. Also, phrases can be downloaded from Internet/intranet as shown in 302.

Another method of composing Phrase List 104 is user's inputs 303.

The Phrase Extraction 301 further comprises a. Add words to the Phrase List 104:
1) Open a new text file of 103, set current position at beginning of the file.
2) Read a string before a space or a mark. Move the current position to the end of the string.
3) If the length of string is greater than a predetermined value, go to 2). If the string only includes letters from "a" to "z" or "A" to "Z", add the string to the Phrase List 104. If the current position is not at the end of the file, go to 2).
4) If the current position is at end of the last file in 103, end. If the current position is at end of the file and the file is not the last file in 103, go to 1).

b. Learn phrases with multiple words from the Text Files 103:
1) Open a new text file of 103, set current position at beginning of the file.
2) Read two consecutive strings from the file $P_i$ and $P_j$ until the end of the last file.
3) If $P_i$ and $P_j$ are in the Phrase List 104, $W_{ij}=W_{ij}+1$; Go to 2).
4) Prune weights: if $W_{ij}/C_i<T$ and $W_{ij}/C_j<T$, then remove weight $W_{ij}$ from N, where T is a pruning threshold.
5) Add new phrases to the Phrase List 104: for each weight, if $W_{ij}$ exists, add a new phrase $P_iP_j$ to the Phrase List.
6) Repeat above steps 1) to 5) until no more new phrase can be added.

c. Remove commonly used words from the Phrase List 104, such as: a, the, of, would, have, that, be, go, I, me, etc.

Figure 4:
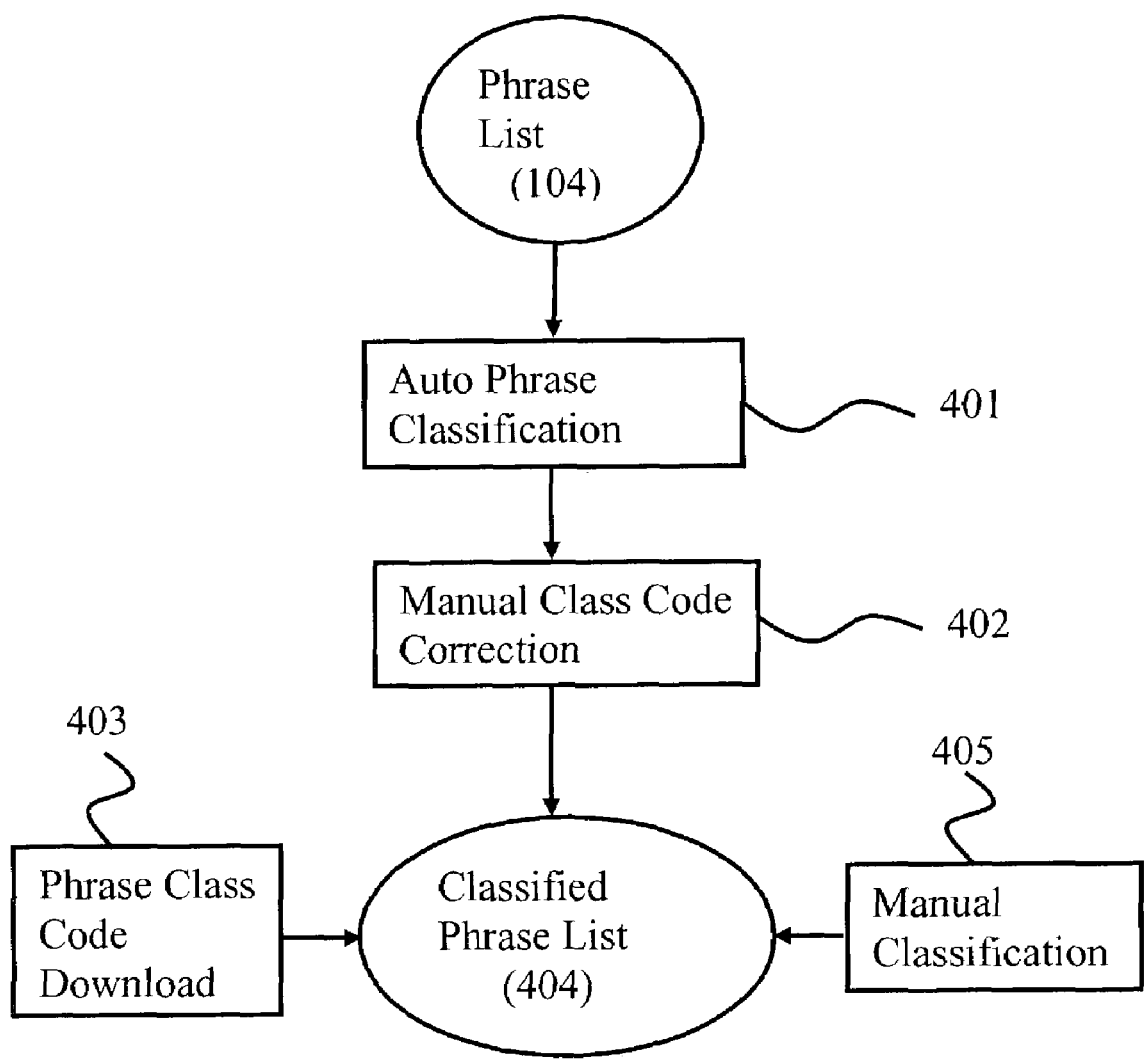
FIG. 4 shows phrase classification methods.

FIG. 4 shows the phrase classification methods. The automatic classification method 401 can be used for phrases such as people, companies with manual class code correction 402. The class codes of phrases can also be downloaded 403 from internet/intranet when the phrases are downloaded in 302. In addition, class codes can be assigned manually 405. Some phrases in 104 may not be classified. The phrases without classification are assigned class code 0. The Classified Phrase List 404 comprises the Phrase List 104 and class code information.

The Classified Phrase List 404 is sorted and can be saved in hard disk. The phrase list can be loaded into memory when system is training a knowledge base or searching the trained knowledge base.

Figure 5:
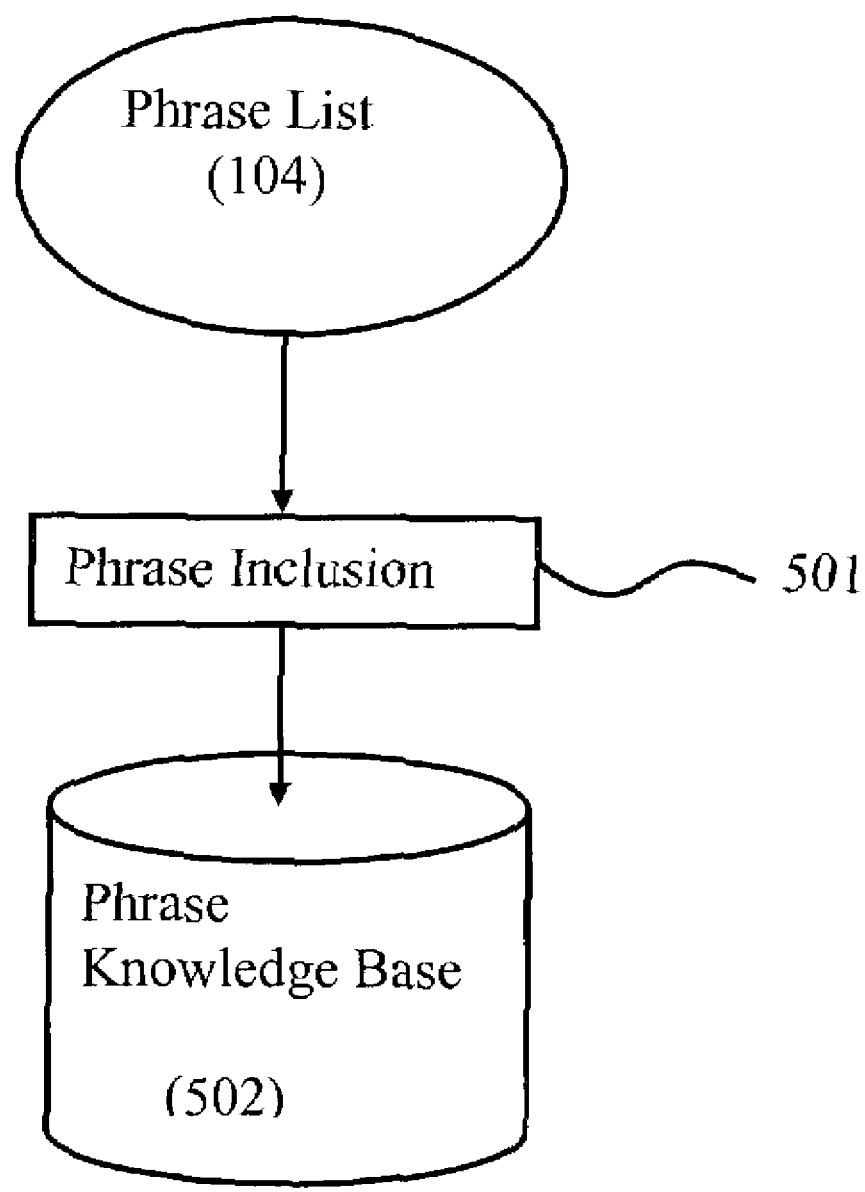
FIG. 5 shows the processes of phrase knowledge base construction.

FIG. 5 shows methods to build a Phrase Knowledge Base, which comprises,
1) A phrase knowledge base is represented as a weighted network.
2) Each phrase is represented by a node of the network.
3) For each string $P_j$ in the Phrase List 104, do:
   for each phrase $P_i$ that is a sub-string of phrase $P_j$, set $W_{ij}=C_j$ and add $W_{ij}$ to the network.

Figure 6:
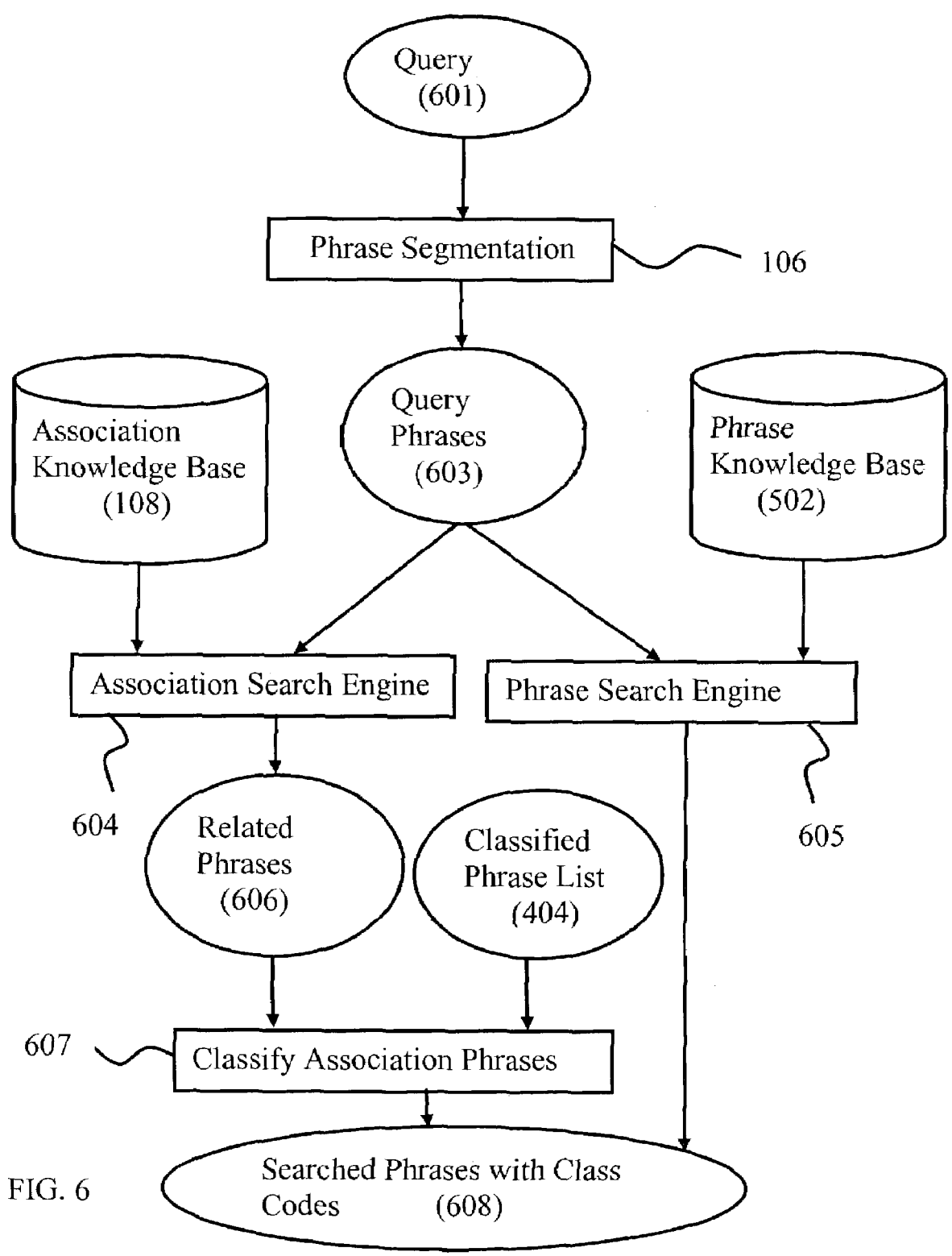
FIG. 6 shows processes of searching a query.

FIG. 6 shows steps of searching a query. For an entered query 601, the Phrase Segmentation 106 method is applied to get all phrases 603 in the query. Then, the Association Search Engine 604 searches the Association Knowledge Base 108 to get the Related Phrases 606 that are related to the query phrases 603. In step 607, the Related Phrases 606 are classified using the Classified Phrase List 404 to get final Searched Phrases with Class Codes 608. On the other hand, the Phrase Search Engine 605 searches the Phrase Knowledge Base 502 to get the phrases that includes at least one query phrase in 603. The phrases searched by Phrase Search Engine 605 are assigned a special class code in 608.

The Association Search Engine 604 further comprises steps:
1) nSize is set as the number of the query phrases in 603.
2) Create an empty phrase and rank value set PS.
3) Set I=0;
4) If I<nSize, I=I+1, go to 5); otherwise go to 8).
5) Get the Ith phrase $P_i$ in 603.
6) Get a list of phrases PL that connect to $P_i$ and the corresponding connection weights from the association knowledge base 108.
7) For each phrase $P_j$ in PL, if $P_j$ is not in PS, add $P_j$ to PS and set the rank value of $P_j$ as a rank function $f(W_{ij}, C_j)$, where $W_{ij}$ is the connection weight between phrase $P_i$ and $P_j$ and $C_j$ is the total count of $P_j$.
If $P_j$ is in PS, the rank value of $P_j$ is increased into $B+f(W_{ij},C_j)$, where B is a predetermined bonus number for multiple connections.

A simple rank function can be set as:

$$f(W_{ij},C_j)=W_{ij}.$$

Another rank function is also useful:

$$f(W_{ij},C_j)=10*W_{ij}/(\text{sqrt}(\log(C_j+1))+1),$$

where sqrt is square root.

8) Sort the phrases in PS based on the rank values with descending order.

The Phrase Search Engine 605 follows the same steps as the Association Search Engine 604 by only replacing the association knowledge base 108 with the phrase knowledge base 502 in step 6).

Figure 7:
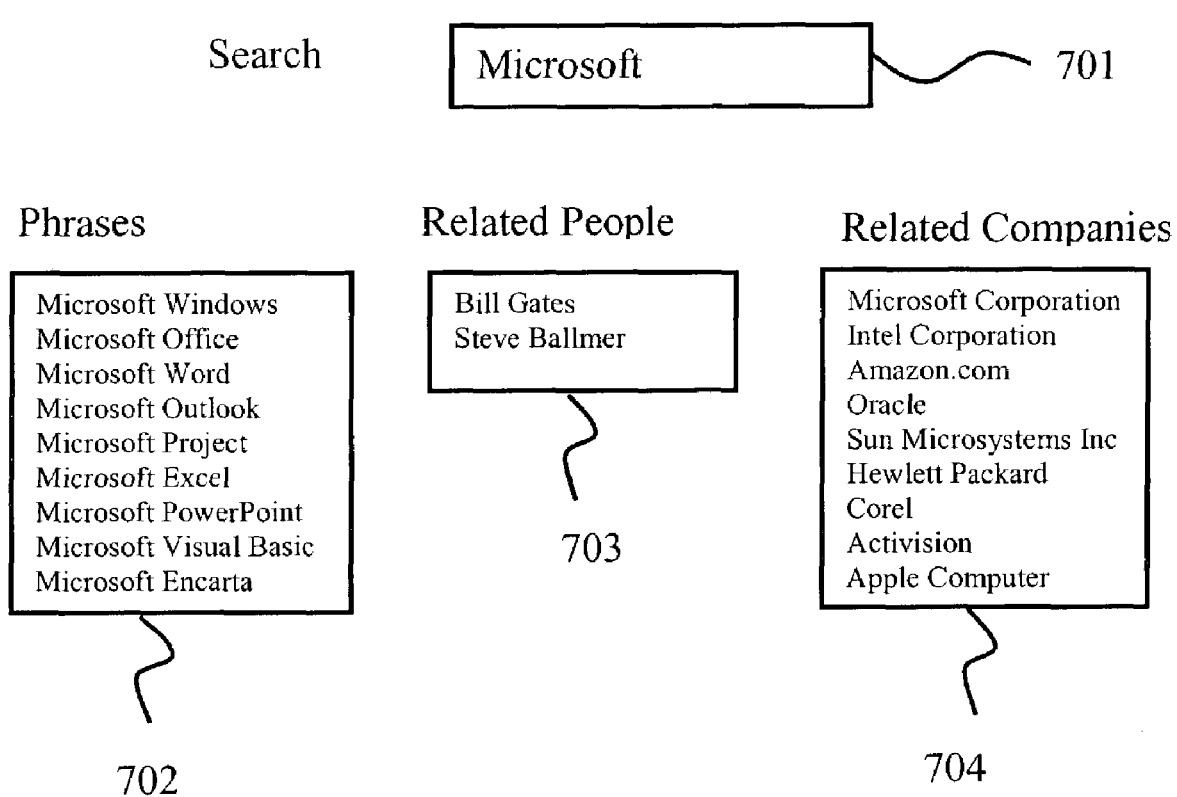
FIG. 7 shows an example of searching a word.

FIG. 7 shows an example of searching a word "Microsoft". After user enters "Microsoft" 701 and starts the search, the phrases that include "Microsoft" are presented in 702. The related people and related companies are presented in 703 and 704 respectively.

Figure 8:
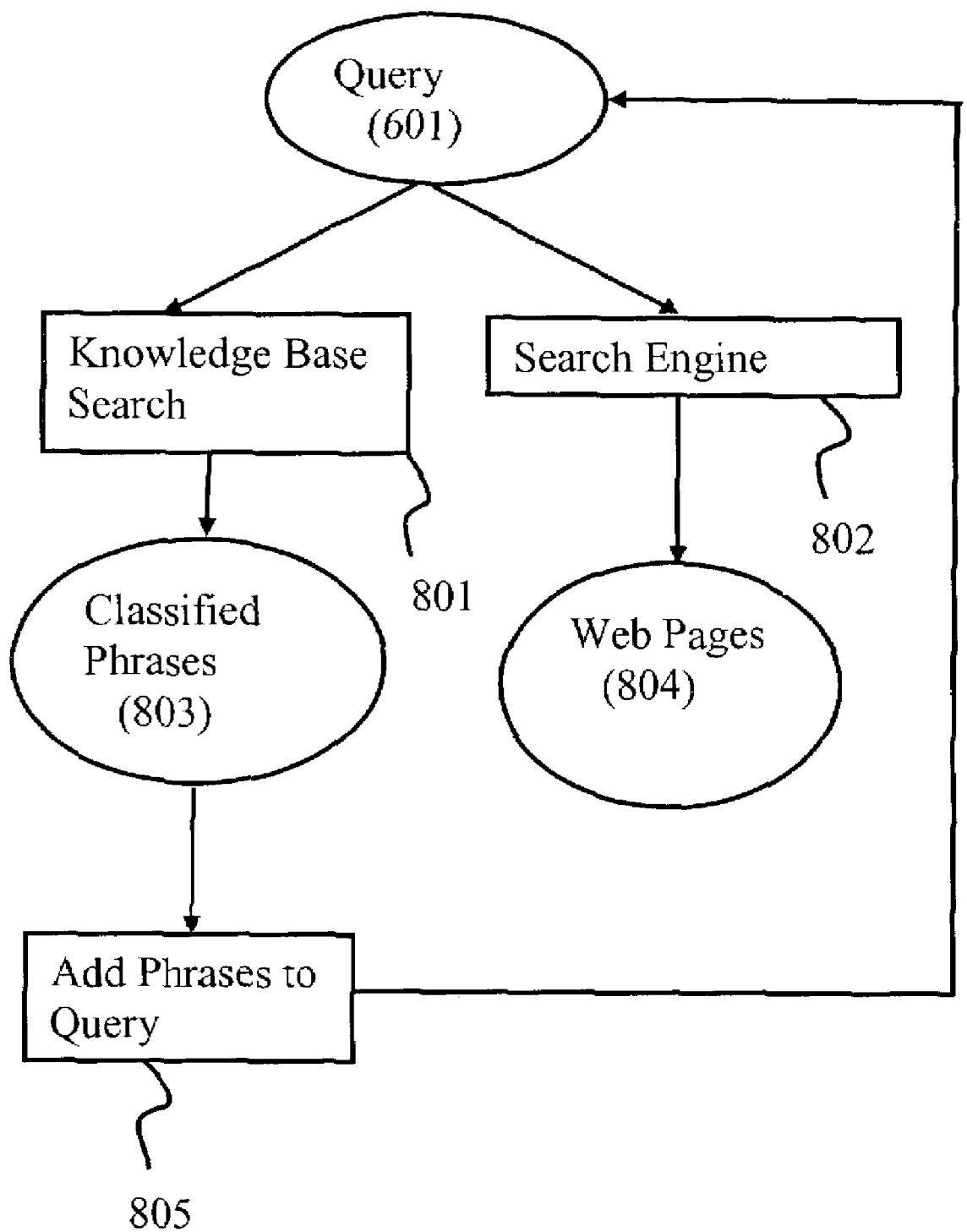
FIG. 8 shows the knowledge base aided search engine.

FIG. 8 shows that the knowledge base can help a search engine to refine search results using knowledge base search results. For a query 601, the Knowledge Base Search 801 will give a list of Classified Phrases 803 and Search Engine 802 will displays a list of Web Pages 804. In 804, a user can select one or more of the searched phrases to add to the query, then search the knowledge bases and web pages again to get new phrases and web pages.

CONCLUSION, RAMIFICATION, AND SCOPE

Accordingly, the reader will see the invention of the knowledge based search using text mining and machine learning methods can largely improve internet/internet and document search efficiency. In this way, a user may directly get the wanted information and doesn't need to scan web pages. The text mining method can also extract some new knowledge that cannot be found directly from web pages. The knowledge base can provide more relevant information than search engines. In addition, the knowledge base can help search engine refine search results. Since the knowledge bases are built automatically using the invented text mining method, the cost of building such a knowledge base can be very lower, the size of the knowledge base can be much bigger, and building time can be much shorter in comparing with building directories or knowledge bases by human beings.

Although the description above contains many specificities, these should not be construed as limiting the scope of the invention, but as merely providing illustrations of some of the presently preferred embodiments of the invention. For example, the invention can apply any languages; the knowledge base can be built using different supervised or unsupervised clustering algorithms; phrases and knowledge base can be stored in memory or hard disk using different data structure; the knowledge base can be integrated with search engines in different ways; Also, the knowledge base can be integrated with other software such database, CRM, ERP, etc.

Thus the scope of the invention should be determined by appended claims and their legal equivalents, rather than by the examples given.

I claim:

1. A method of text mining for automatically building a knowledge base, comprising the steps of:
    receiving first document files from various document sources;
    filtering out non-textual elements from said first document files;
    generating second text files from said first documents files after filtering;
    segmenting said second text files into sentence texts;
    segmenting said sentence texts into phrases according to a pre-defined phrase list, and generating phrase sets according to first predefined rules;
    training phrase associations among said phrases using said phrase sets; and
    forming a phrase association knowledge base being represented as a weighted network structure.

2. The method of claim 1, wherein said training phrase associations including the steps of:
    designating a network;
    calculating the frequency of each said phrase appearing in said phrase sets;
    designating each said phrase as a node in said network;
    identifying and establishing connections among said phrases within said phrase set;
    assigning connection weights to each said connection;
    updating said network through each said phrase set by increasing said connection weights between two said phrases within said phrase set according to second pre-defined rules.

3. The method of claim 1, wherein said pre-determined phrase list is generated using methods from a group consisting of phrase extraction method, direct downloading method, and user's manual input method.

4. The method of claim 2, wherein said training phrase associations further comprising steps of pruning network to delete any said connections of said phrases with weak said connection weights in said network according to a pre-determined threshold, whereby if said connection weights of said phrases do not meet a pre-determined threshold, said connections of said phrases will be deleted from said network.

5. A method of text mining for automatically building a knowledge base, comprising the steps of:
    receiving first document files from various document sources;
    filtering out non-textual elements from said first document files;
    generating second text files from said first documents files after filtering;
    segmenting said second text files into sentence texts;
    segmenting said sentence texts into phrases according to a pre-defined phrase list, and generating phrase sets according to first predefined rules, said pre-defined phrase list being generated using methods from a group consisting of phrase extraction method, direct downloading method, and user's manual input method.
    training phrase associations among said phrases using said phrase sets, including steps of designating a network, calculating the frequency of each said phrase appearing in said phrase sets, designating each said phrase as a node in said network, identifying and establishing connections among said phrases within said phrase set, assigning connection weights to each said connection, updating said network through each said phrase set by increasing said connection weights between two said phrases within said phrase set according to second pre-defined rules;
    pruning network to delete any said connections of said phrases with weak said connection weights in said network according to a pre-determined threshold, whereby if said connection weights of said phrases do not meet a pre-determined threshold, said connections of said phrases will be deleted from said network.
    forming a phrase association knowledge base being represented as a weighted network structure.

6. A method of text mining for automatically building a phrase knowledge base, comprising the steps of:
    providing a phrase list having phrases, each said phrase including appearance count;
    designating a network;
    designating each said phrase from said phrase list as a node of said network;
    assigning a weight in a direction from a sub-phrase of said phrase to said phrase according to appearance count of said phrase, and
    forming a phrase knowledge base being represented as a weighted network.

* * * * *